United States Patent [19]

Güttinger

[11] Patent Number: 5,324,240
[45] Date of Patent: Jun. 28, 1994

[54] ECCENTRIC GEAR SYSTEM

[75] Inventor: Heinrich Güttinger, Wettingen, Switzerland

[73] Assignee: Aginfor AG fur industrielle Forschung, Wettingen, Switzerland

[21] Appl. No.: 3,009

[22] Filed: Jan. 11, 1993

[30] Foreign Application Priority Data

Jan. 10, 1992 [EP] European Pat. Off. ...... 92 810016.3

[51] Int. Cl.⁵ ............................................. F16H 1/32
[52] U.S. Cl. ........................................... 475/162
[58] Field of Search ................................. 475/162

[56] References Cited

U.S. PATENT DOCUMENTS 4,243,355 1/1981 Brudi et al. .................. 475/162
4,674,361 6/1987 Parsons ......................... 475/162

FOREIGN PATENT DOCUMENTS 2731486 1/1979 Fed. Rep. of Germany .
1453135 10/1976 United Kingdom .
2160612 12/1985 United Kingdom .

Primary Examiner—Dirk Wright
Attorney, Agent, or Firm—Burns, Doane, Swecker & Mathis

[57] ABSTRACT

In an eccentric gear in which the gear rim of a first orbiting cog wheel is in engagement with the gear rim of a second rotating cog wheel, the two gear rims are offset from each other by an eccentricity. The second cog wheel is fixed to a driven shaft seated in a fixed housing. At least three eccentric shafts, which are evenly spaced about the circumference of the cog wheel, are provided for guiding the orbiting cog wheel, the eccentrics of each shaft being seated in respective bores of the orbiting cog wheel. One of the three eccentric shafts extends through the housing wall on one side and is formed as the drive shaft. The three eccentric shafts are coupled via a slider orbiting with an eccentricity which is considerably greater compared with the drive eccentricity.

3 Claims, 2 Drawing Sheets

ECCENTRIC GEAR SYSTEM

FIELD OF THE INVENTION

The invention relates to eccentric gear systems in which the gear rim of a first orbiting cog wheel is in engagement with the gear rim of a second cog wheel, the two gear rims being offset from each other by the eccentricity and the second cog wheel being connected with a driven shaft seated in a fixed housing for driving the shaft.

BACKGROUND OF THE INVENTION

Eccentric gears are employed particularly in industrial robots because they are distinguished by their small dimensions, their lack of rotary play and their torsional rigidity. They essentially consist of a central, rapidly rotating drive shaft provided with an eccentric. A cog wheel with an outer gear-tooth system is seated on the eccentric, which meshes with an inner gear-tooth system during operation. This inner gear-tooth system is conventionally disposed on a geared wheel which is fixedly connected with the housing. The ratio of the gear is a function of the number of teeth in the two meshed sets of gear-tooth systems or of the diameter of their pitch circles. Meshing of the gear-tooth systems always takes place where the eccentric is closest to the pitch circle. The movement of the smaller gear-tooth system is opposite to that of the eccentric and corresponds to the difference of the circumference of the two gear-tooth systems. The cog wheel guided on the eccentric turns around its own axis. However, the latter turns on a circular path defined by the eccentric. The cycloidal movement resulting from this must be turned back into a rotating movement. The cog wheel is provided with a large number of bores for this, each of which is engaged by a carrier bolt. These carrier bolts are fastened on a flange which is connected fixed against relative rotation on the driven shaft and in this way they form the coupling between the driving and the driven end of the shaft. Such gears must be provided with a compensating or readjustment device in order to be able to counteract the tooth play and the play in the bolt coupling.

OBJECT AND SUMMARY OF THE INVENTION

It is an object of the invention to provide an eccentric gear of the above mentioned species which does not require a bolt coupling and the shortcomings connected therewith.

This is attained in accordance with the invention in that one of the at least three eccentric shafts extends through the housing wall on one side and is formed as the drive shaft, and the at least three eccentric shafts are connected with each other via a slider orbiting with an eccentricity which is considerably greater compared with the drive eccentricity.

An advantage of the invention lies in the unambiguous and highly precise guidance of the orbiting parts, which has an advantageous effect on tooth meshing. It is possible to omit means for counteracting play of the teeth. A further advantage lies in the omission of the central drive, customary up to now. Because of this it is possible to utilize the central area on the drive side which now is unoccupied for seating the heavily strained driven shaft, for example.

The slider orbits with an eccentricity which is considerably greater compared with the drive eccentricity. This arrangement makes it possible to realize very large reduction gear ratios with only one gear stage and thus with very small drive eccentricity. Small eccentrics are self-locking and cannot pass on the drive torque. By means of the new measure it is possible to transmit the torque from the rotating slider to the rotating cog wheel without problems, because of which the otherwise required forced drive, for example by a toothed belt drive, of all participating eccentric shafts can be omitted. The new measure furthermore permits the employment of cost-effective friction bearings for the eccentrics.

An exemplary embodiment of the invention is schematically illustrated in the drawings.

BRIEF DESCRIPTION OF THE DRAWING FIGURES

DETAILED DESCRIPTION OF THE PREFERRED EMBODIMENT

Figure 1:
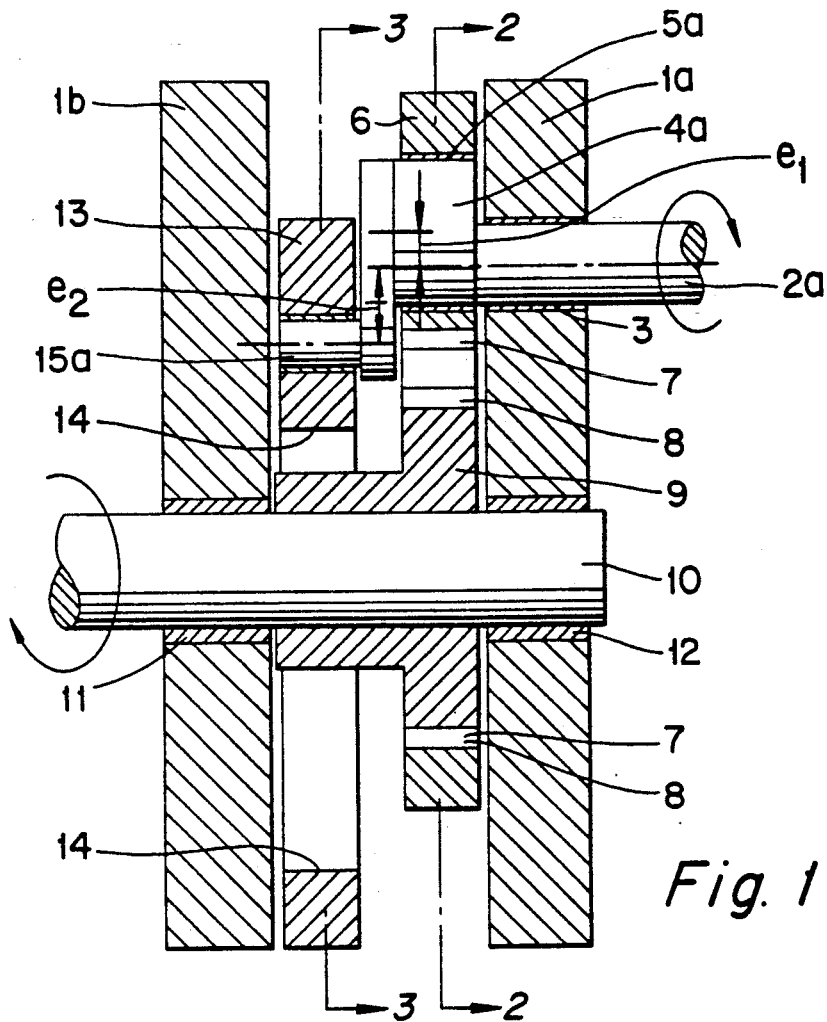
FIG. 1 is a longitudinal section through an eccentric gear system of the present invention.
Figure 2:
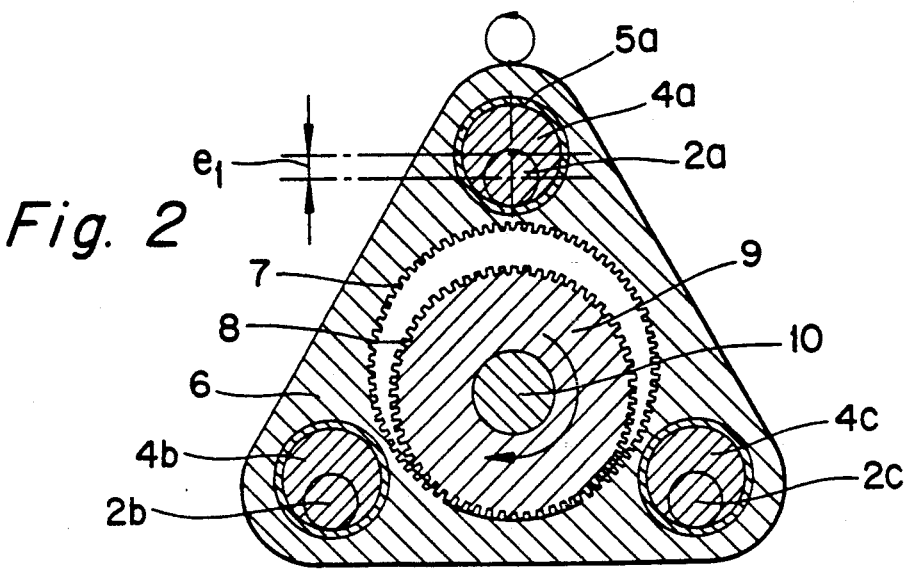
FIG. 2 is a cross section through the eccentric gear system along the line II—II of FIG. 1.
Figure 3:
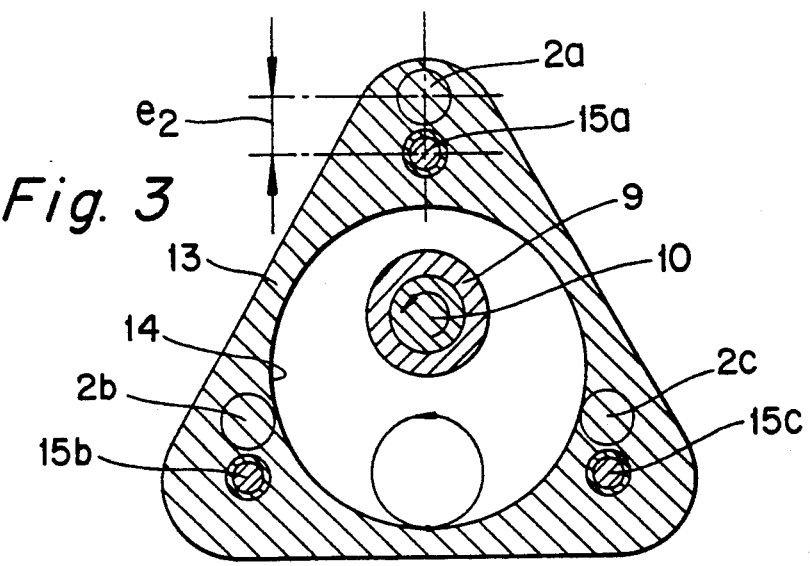
FIG. 3 is a cross section through the eccentric gear system along the line III—III of FIG. 1.

The eccentric gear system in accordance with FIGS. 1 to 3 is shown in its simplest form. It consists of the two housing halves 1a and 1b which are connected with each other in the conventional manner by means of screws, not shown. Drive of the gear takes place via an eccentric shaft 2a extending through the housing half 1a. The shaft 2a is rotatably seated by means of a friction bearing 3 in this housing half 1a. The shaft 2a is equipped with an eccentric 4a which is also embodied as a friction bearing and is rotatably seated in a bore 5a of an orbiting cog wheel 6.

Rotation of the eccentric 4a by the drive shaft 2a causes the orbiting cog wheel 6 to move in a rotary, or orbiting, path about the drive shaft. To avoid a rotation of the orbiting cog wheel 6 itself, two further eccentric shafts 2b and 2c are provided for guiding the orbiting cog wheel 6. They are also rotatably seated in the housing half 1a and their respective eccentrics 4b and 4c engage corresponding bores in the cog wheel 6. The three eccentric shafts and the associated bores are each spaced about the circumference of the orbiting cog wheel, offset by 120°, and are located in the same radial plane. The orbiting cog wheel 6 has a gear rim 7 with an inner gear-tooth system.

A rotating cog wheel 9 is driven by the orbiting cog wheel 6. This cog wheel 9 performs a purely rotating movement and is connected, fixed against relative rotation, with a driven shaft 10. In the example shown, the driven shaft 10 is rotatably seated by means of friction bearings 11 and 12 in the housing halves 1a and 1b. A gear rim 8 with a corresponding outer gear-tooth system is in engagement with this inner gear-tooth system performing an orbiting movement. This second gear rim is a part of the rotating cog wheel 9.

The center axes of the two cog wheels are axially offset from each other with the same eccentricity e1 which the eccentrics 4a to 4c have. This only very slight eccentricity e1 determines the gear ratio. Corresponding to the slight eccentricity, the driven cog wheel has only slightly fewer teeth than the driving cog wheel. This by itself results in one of the advantages of this gear arrangement, namely that the gear-tooth system operates with an extended tooth engagement path. Therefore, the gear ratio is a function of the numbers of the teeth of the two systems or respectively of the pitch circle diameters of the two gear-tooth systems which are in engagement with each other. If the drive shaft and thus the eccentric 4a makes a full revolution, a complete tooth change takes place between the cog wheels. During this revolution all teeth have been in engagement. However, the driven rotating cog wheel has not turned completely around its own axis but has only moved on by the difference between the numbers of teeth. If, for example, the orbiting cog wheel has 110 teeth and the rotating cog wheel has 100 teeth, the inner cog wheel 9 has moved on by 10 teeth with one revolution of the eccentrics 4a to 4c. Therefore the outer cog wheel 6 must rotate ten times for the inner cog wheel 9 to make a complete revolution. Accordingly, the gear ratio is 1:10. The pitch circle diameters of the two engaged gear-tooth systems act accordingly. The difference between the pitch circle diameters is always twice that of the eccentricity e1.

It follows from this that with a large gear ratio the eccentricity e1 can become so small that the transmission of the drive torque via the eccentric 4a alone is no longer possible. The disposition of a slider 13, which connects the three eccentric shafts 2a, 2b and 2c with each other, provides a remedy here. To transmit the torque, this slider then must orbit with an eccentricity e2 which is greater than the drive eccentricity e1. It is understood that it is necessary to refrain from citing absolute values in this connection, because these depend on too many parameters. The eccentricity e2 to be chosen must be great enough in any case to overcome the self-locking of too small a drive eccentricity e1. On the other hand, it should not be overwhelmingly great in order to avoid large unbalanced masses, which must be compensated, and increased exterior size of the gear.

In the example, this slider 13 has been conceptualized as a disk provided with a hole 14 in the center for guiding the driven shaft 10 through. The disk is seated free-floating on three eccentric bolts 15a, 15b, 15c. On the driven side these eccentric bolts are connected with the eccentrics 4a, 4b and 4c. Their respective eccentric axes have the eccentricity e2 in respect to the drive shaft. It is offset by 180°, i.e. one-half revolution, in respect to the eccentric axis of the associated eccentric 4. With appropriate dimensions of the disk 13, this arrangement results in the possibility of a compensation between the masses of the two orbiting elements 6 and 13.

The invention is of course not limited to the exemplary embodiment illustrated and described. In a variation with the illustrated arrangement with single eccentrics 4a, 4b and 4c, the three eccentric shafts, i.e. the drive shaft 2a and the two guide shafts 2b and 2c could each be provided with a double eccentric. In this case the two disks of the double eccentric with the same eccentricity e1 would each be offset by 180° from each other and a cog wheel would be seated on each of them. A complete weight compensation of the eccentric imbalance is provided by installing two directly adjoining cog wheels. In this case a compensating weight would also have to be provided next to the circulating slider. Based on the then resulting axial length of the eccentric shafts with the combination of double eccentric/slider/compensating weight, it then might also be practical to seat the eccentric shafts a second time in the housing half 1b.

Figure 4:
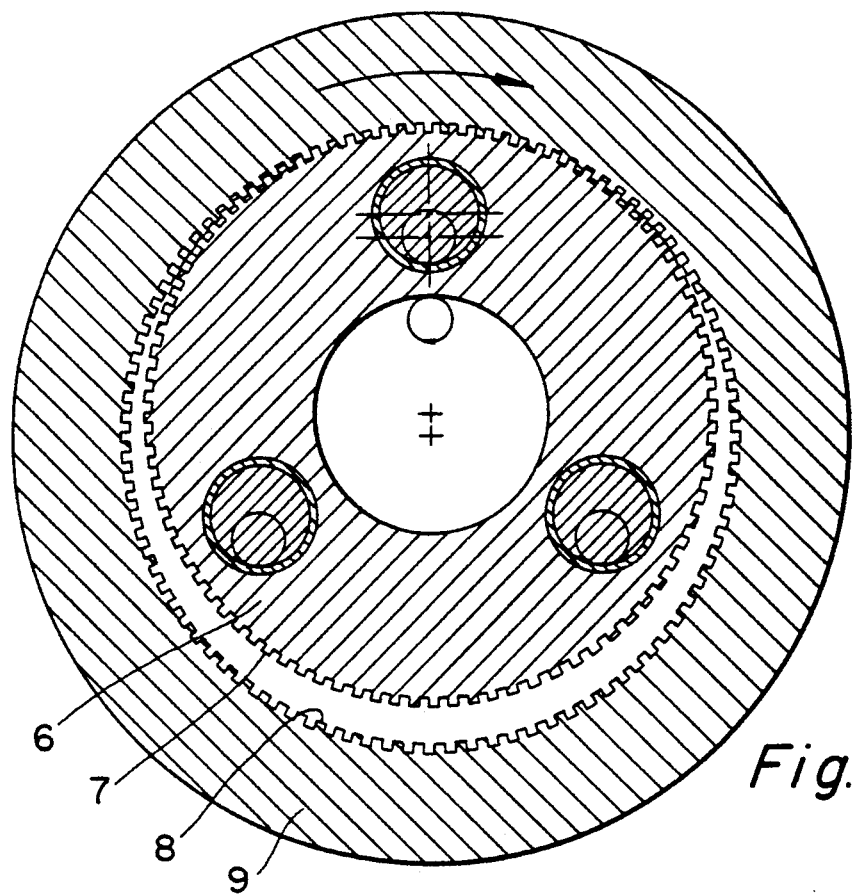
FIG. 4 is an alternative embodiment in which an orbiting cogwheel has external gear teeth.

In another variant embodiment shown in FIG. 4, the gear rim 7 of the orbiting cog wheel 6 has an outer gear-tooth system and the gear rim 8 of the second cog wheel 9, which is displaced by the eccentricity, has an inner gear-tooth system. The latter would then be disposed as a rotating cog wheel on a flange connected with the driven shaft. If teeth of the same module as in the above described embodiment were to be selected, this variant would have the advantage that it would be possible to achieve a greater gear ratio with one gear stage.

In place of the friction seating shown, the participating elements could of course also run in rolling bearings, for which roller bearings or contact ball bearings would be indicated for the shaft seats and needle bearings for the eccentrics.

In a proper modification of the concept of the invention, the attainment of the object can also be employed in orbiting helical machines operating in accordance with the displacement principle. Instead—as with an eccentric gear—of the gear rim of a first orbiting cog gear being in engagement with the gear rim of a second cog gear, the helix or helices of a first displacement disk—in a helical machine—would be in engagement with the helix or helices of a second displacement disk. The two displacement disks would be offset from each other by the drive eccentricity. The second displacement disk would be connected, fixed against relative displacement, with a driven shaft seated in a fixed housing. Three eccentric shafts, evenly distributed over the circumference of the cog wheel, would be provided for guiding the orbiting displacement disk, the eccentrics of each shaft being seated in corresponding bores of the displacement disk. Here, too, one of the three eccentric shafts would extend through the housing wall on one side and be embodied as a drive shaft. The three eccentric shafts would also be connected with each other by means of a slider which would orbit with a considerably greater eccentricity compared with the drive eccentricity.

The foregoing has described the preferred principles, embodiments and modes of operation of the present invention; however, the invention should not be construed as limited to the particular embodiments discussed. Instead, the above-described embodiments should be regarded as illustrative rather than restrictive, and it should be appreciated that variations, changes and equivalents may be made by others without departing from the scope of the present invention as defined by the following claims.

What is claimed is:

1. An eccentric gear system, comprising:
   an orbiting cog wheel;
   a rotating cog wheel;
   a gear rim of the orbiting cog wheel in engagement with a gear rim of the rotating cog wheel, the two gear rims being axially offset from each other by a drive eccentricity;
   the rotating cog wheel fixed to a driven shaft seated in a housing;
   at least three shafts seated in the housing for guiding the orbiting cog wheel, each shaft having a first eccentric seated in a respective bore of the orbiting cog wheel, the bores evenly spaced in the orbiting cog wheel about the circumference of the gear rim;
one of the at least three shafts forming a drive shaft; and,
a slider connected with each shaft via a second eccentric, the second eccentric having a second eccentricity which is considerably greater than the drive eccentricity.

2. An eccentric gear system according to claim 1, wherein the gear rim of the orbiting cog wheel is an inner gear-tooth system and the gear rim of the rotating cog wheel is an outer gear-tooth system.

3. An eccentric gear system according to claim 1, wherein the gear rim of the orbiting cog wheel is an outer gear-tooth system and the gear rim of the rotating cog wheel is an inner gear-tooth system disposed on a flange connected with the driven shaft.

* * * * *